Feb. 24, 1953 D. H. RING 2,629,772

REDUCTION OF PHASE DISTORTION

Filed Sept. 21, 1951 2 SHEETS—SHEET 1

INVENTOR
D. H. RING
BY H. O. Wright
ATTORNEY

Feb. 24, 1953 D. H. RING 2,629,772

REDUCTION OF PHASE DISTORTION

Filed Sept. 21, 1951 2 SHEETS—SHEET 2

INVENTOR
D. H. RING
BY
H. O. Wright
ATTORNEY

Patented Feb. 24, 1953 2,629,772

UNITED STATES PATENT OFFICE 2,629,772

REDUCTION OF PHASE DISTORTION

Douglas H. Ring, Red Bank, N. J., assignor to Bell Telephone Laboratories, Incorporated, New York, N. Y., a corporation of New York Application September 21, 1951, Serial No. 247,680

6 Claims. (Cl. 178—44)

This is a divisional application of my copending application Serial No. 111,495, filed August 20, 1949, for "Reduction of Phase Distortion," and relates to the long distance transmission of intelligence through highly dispersive transmission media and more particularly to band-inverting devices in systems for the transmission of intelligence-bearing electromagnetic waves through wave guides.

The wave guide, or hollow pipe guide, unlike conventional transmission lines, has the peculiar property that it is highly dispersive, i. e., the phase velocity of wave transmission varies markedly and non-linearly with frequency, especially so in the frequency range somewhat above the transmission cut-off frequency that is of principal interest for communication purposes. A principal consequence of this dispersion is distortion of the modulated signal when recovered at receiving stations in the system, the modulation distortion being in the form of phase distortion and also practically ineradicable harmonic and non-linear amplitude distortion.

In accordance with a principal feature of said copending application such dispersion introduced by different sections of a long distance wave-guide signal transmission line is caused to be counteracted by the dispersion introduced by other sections. More particularly, the total signal to be transmitted is amplitude modulated upon a microwave carrier and the resulting set of signal sidebands with their associated carrier signal is impressed as a "high frequency signal" on a wave guide. At intervals along the guide the high frequency signal is amplified and at intervals it is passed through a device that inverts it about the frequency of the microwave carrier. After an odd number of such inversions the high frequency signal reaches a receiving station where it is detected to reproduce the total signal. The latter is then separated in accordance with usual practice to recover the various component television and telephone signals.

The present application is principally directed to the band-inverting devices for such systems.

It is, therefore, a principal object of the present invention to invert the signal band in the frequency spectrum.

Other and further objects will become apparent during the course of the following description and from the appended claims.

In the specific embodiments to be described, this inversion process is such that energy formerly carried in the highest frequency component of the upper sideband appears in the lowest frequency component of the lower sideband, and conversely, the energy formerly carried in the highest frequency component of the lower sideband becomes the lowest frequency in the upper sideband. In general such inversion is accomplished by beating the double sideband signal with energy of frequency higher than the highest frequency component of the upper sideband and filtering out the desired resulting component.

Special features of the invention reside in the novel wave-guide component combinations by which this operation is performed with a minimum number of components.

The nature of the present invention and its various objects, features and advantages will appear more fully upon consideration of the embodiments illustrated in the accompanying drawings and the following detail description thereof.

In the drawings:

Fig. 1, given by way of explanation, shows schematically a long distance wave-guide communication system for transmitting wide band multiplex signals of the type in which the band inverting devices, in accordance with the invention, may be employed;

Figure 1:
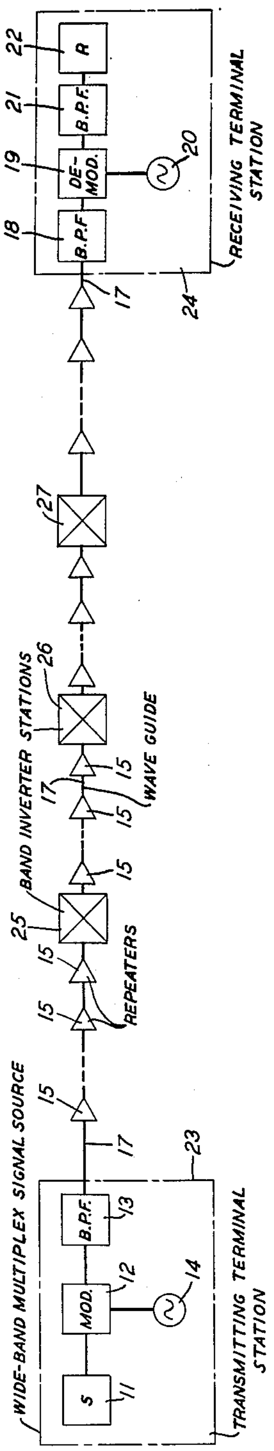

Before proceeding to a detailed description of the band inverting devices of the present invention, it is believed worthwhile to briefly set forth a typical system of the type in which these devices may be employed. If a more detailed analysis of such systems is desired, reference may be had to the above-mentioned copending application. Thus, Fig. 1 shows a simple embodiment of a system wherein a wide band multiplex signal from transmitting terminal station 23 is applied to long distance wave-guide transmission system 17 for communication to receiving terminal station 24. The high frequency signal transmitted by station 23 will suffer attenuation and phase dispersion due to the transmission characteristics of the long distance wave guide. To eliminate the effects of the attenuation characteristic a plurality of microwave repeaters 15 are placed at intervals along wave-guide line 17.

To reduce or eliminate the effects of the phase dispersion characteristic, a plurality of band-inverter stations, for example, 25, 26 and 27, are placed at greater intervals along the line in accordance with the invention.

The transmitting terminal station 23 may comprise a signal source 11, a modulator 12, a microwave carrier source 14 and a form of output band-pass filter 13 as fundamental units. In such a system signal source 11 may be the output of any well-known wide band multiplex signal device. Such a signal representing the intelligence to be transmitted is impressed in modulator 12 on the microwave carrier from source 14. Modulator 12 will combine the intelligence signal with the carrier wave in accordance with the characteristics of the modulating process employed. The resulting high frequency signal is impressed on wave-guide transmission line 17 through band-pass output filter 13 which passes the frequency components desired to be transmitted to the line. Wave guide 17 may be of any of the well-known forms of rectangular or circular hollow conducting pipe wave guides.

The receiving terminal station 24, like transmitting terminal station 23, may be of any of the numerous well-known designs adapted to receive the wide band high frequency signal, demodulate it and separate it into its component signal channels. For example, the station may comprise an input broad-band filter 18 through which the line frequencies are passed to a demodulator 19 where the total signal is demodulated with a local oscillator source 20 supplying beating oscillations, a suitable filter assembly means 21 comprising a plurality of band-pass filter means to separate the component signal channels in accordance with the usual practice to recover the various component telephone and television signals, and a receiving means assembly 22.

The band-inverter stations 25, 26, 27, may be of the types to be described hereinafter in detail, and their function, placement, operation and the various advantages therefrom will become apparent as the description progresses.

First, however, it will be desirable to analyze the dispersive effect of a long wave guide on the high frequency wave transmitted therethrough and its subsequent effect on the demodulated output thereof.

Consider, therefore, a single long section of repeated wave guide such as that between the transmitting terminal station 23 and the first inversion point 25. Such a wave-guide section is highly dispersive, that is, it will destroy the essential phase relationships of the carrier and each of the sideband pair components. This effect may be termed wave dispersion or phase velocity distortion and will be such as to introduce a shift to the phase angle of each component frequency of the wave. As a result the lower sideband component will suffer a smaller phase shift angle than the carrier phase shift angle. Likewise the upper sideband component will suffer a greater phase shift angle than the carrier phase shift angle. Since in the case of a long wave guide, the phase shift characteristic is non-linear or dispersive with respect to frequency, i. e., a greater difference between the phase shift of the carrier and the phase shift in the lower sideband frequencies than in the difference between the phase shift of the upper sideband frequencies and the phase shift of the carrier, a non-symmetrical delay characteristic about the carrier frequency is rendered, and the sidebands will not add in phase upon demodulation. Rather, the out-of-phase sidebands will be combined to produce a demodulated output suffering both amplitude and phase or delay distortion. Since the magnitude of these distortion effects depends upon frequency, the dispersion giving rise thereto will be instrumental in limiting the useful band width of the wave guide.

In accordance with the invention in said copending application, the intelligence-bearing capacity of the wave-guide transmission system is increased by introducing band inverter stations, for example stations such as 25, 26 and 27, at intervals along the length of the line. When a high frequency signal comprising a microwave carrier and a set of signal sidebands each frequency of which has suffered a particular value of phase angle distortion is inverted about the carrier frequency, the signs of all phase angles are changed. The band may be inverted in the frequency spectrum about a frequency substantially the same as the original carrier frequency, or as hereinafter described, about a frequency slightly removed from the original carrier frequency.

Thus in the illustrative system of Fig. 1, the transmitted signal, which suffers a certain amount of phase dispersion in passing through the wave guide 17 and repeaters 15 from the transmitting terminal station 23 to band-inverter station 25, is inverted and passed through the second section from inverter station 25 to inverter station 26, during which time the dispersion introduced by the first section is progressively canceled during passage through the second section. The process continues in similar fashion down the length of the line, which may be several thousand miles, to the receiving terminal station.

Figure 2:
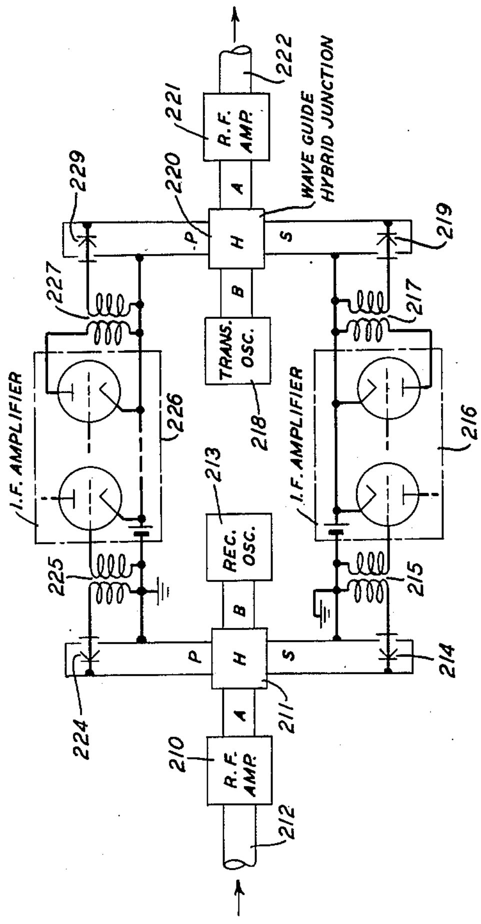
Fig. 2 illustrates a specific form of microwave-inverting repeater therefor in accordance with the invention.

Fig. 2 shows a repeater in accordance with the present invention suitable for use in the long distance transmission system of Fig. 1. This repeater may be used to insert a desired amount of gain in the wave-guide path in addition to inverting the signal bands in accordance with the invention.

In Fig. 2 radio frequency amplifier 210 is shown with its input connected to input line 212 and its output connected to terminal A of hybrid 211. A heterodyne receiving oscillator 213 is connected to conjugate terminal B of the hybrid. Identical crystal heterodyne detectors 214 and 224 are matched to terminals S and P, respectively, of hybrid 211. The IF outputs of these detectors are matched to inputs of IF amplifiers 216 and 236 by transformers 215 and 225. The outputs of IF amplifiers 216 and 226 are matched to two identical crystals 219 and 229 by transformers 217 and 227, respectively. These crystals are connected to the P and S arms of hybrid 220 and a transmitting heterodyne oscilaltor 218 is connected to arm B of the hybrid 220. Arm A, the output of hybrid structure 220, feeds radio frequency output amplifier 221 connected to output line 222. The crystal detector-hybrid-oscillator structure 219, 229, 220, 218 may be the same as the input detector-hybrid-oscillator structure 214, 224, 211, 213.

Radio frequency amplifiers 210 and 221 may be of the type of any well-known microwave amplifiers, for example, the velocity modulator or traveling wave type amplifier as disclosed in United States application of J. R. Pierce, Serial No. 640,597, filed January 11, 1946, and described in the Proceedings of the Institute of Radio Engineers, February 1947, volume 35, pages 108 through 111, or a closely spaced triode amplifier of the type disclosed in the United States Patent 2,502,530, granted to J. A. Morton and R. L. Vance, April 4, 1950.

Other components, for example, oscillators 213 and 218, detector crystals 214, 224, 219 and 229 and IF amplifiers 216 and 226 are all standard microwave frequency components and their selection and design may easily be accomplished by one skilled in the art. IF transformers 215, 225, 217 and 227 are shown and will be treated in the following detailed description as wire wound components for convenience, but well-known types of wave-guide transformers are equally suitable.

Hybrid junctions 211 and 220 can be structures of the so-called wave-guide junction or wave-guide coaxial or other transmission line loop structures of the types illustrated and described, for example, in United States Patent 2,445,895 granted to W. A. Tyrrell, July 27, 1948, and described in the Proceedings of the Institute of Radio Engineers, volume 35, November 1947, pages 1294 through 1306, or of the type illustrated and described with reference to Figs. 4, 5 and 6, United States Patent 2,531,447, granted November 28, 1950, to W. D. Lewis.

Whatever form of hybrid structure is employed it should have four terminations, associated in two pairs, each termination of a pair being conjugately related to the other termination of the same pair. For convenience here, the notation adopted in the above-mentioned patent of W. D. Lewis will be employed throughout the following description and figures of the drawings showing hybrid junctions, in which the first pair will be designated P and S, respectively, and the terminations of the second pair will be designated A and B, respectively. The inherent properties of the hybrid junction are well known in which voltage wave energy introduced into the structure from either termination of the first pair will produce no energy leaving the structure by the other termination of that pair, but the energy introduced will divide equally between the other pair of terminations A and B of the hybrid structure.

Further, the voltage waves representing the halves of the energy in each of the second pair of terminals A and B will be in phase if the energy is introduced by the P termination of the first pair, or 180 degrees out of phase if it is introduced by the S termination of the first pair. For the purposes of the analysis to follow it will be assumed that this out of phase relation is produced by a phase delay of 180 degrees between the B and P terminals and no phase delay between the A and P terminals.

Conversely, if equal voltage wave energies are introduced in phase to the two terminations P and S of the first pair they will combine in the termination A of the second pair, no voltage wave energy being transmitted to the termination B.

If equal voltage wave energies are introduced 180 degrees out of phase to the two terminations P and S they will combine in the termination B of the first pair, no voltage wave energy being transmitted to the termination A.

With the basic principles of hybrid junctions in mind the operation of the repeater of Fig. 2 may be analyzed as follows:

The incoming signal of mid-frequency $f_s$ and sidebands $\pm m$ is amplified by amplifier 210 and fed into hybrid 211 where the signal power divides equally between arms P and S. No signal power appears at terminal B. The output of the receiving oscillator 213 connected to arm B of hybrid 211 similarly divides equally between the arms P and S, and does not appear at arm A.

Thus crystals 214 and 224 terminating arms P and S are fed power from both the signal and receiving oscillator 213. The receiving oscillator frequency $f_R$ is adjusted so that $$f_R - f_s = f_2 \quad (1)$$

where $f_2$ is the intermediate frequency. The sidebands of $f_s$ will appear inverted at the IF frequency because $$f_R - (f_s - m) = f_2 + m \quad (2)$$

and $$f_R - (f_s + m) = f_2 - m \quad (3)$$

The heterodyne output from the detectors 214 and 224 at the IF frequency $f_2$ passes through the IF amplifiers 216 and 226 to the crystals 219 and 229 connected to the hybrid 220. The transmitting oscillator 218 is also connected to the hybrid in such a way that the oscillator power divides equally between the two arms P and S. Thus crystals 219 and 229 are energized by the IF signals and transmitting oscillator 218 and generate beats between these two frequencies. The transmitting oscillator 218 is set to operate at a frequency $f_T$ such that $$f_3 = f_2 + f_T \quad (4)$$

where $f_3$ is the desired output frequency. No inversion takes place in this heterodyne process since $$(f_2 + m) + f_T = f_3 + m \quad (5)$$

and $$f_2 - m + f_T = f_3 - m \quad (6)$$

and therefore the inversion occurring in the first heterodyne process is preserved. The beat signals generated by the crystals 219 and 229 are fed into hybrid 220 in such a way that the outputs of the two crystals add in arm A, and no desired output power is fed into arm B. This can be seen by tracing the significant phase shifts occurring in passing through the system via the two parallel paths. The input signal at A of hybrid 211 appears in the same phase at crystals 214 and 224, and the receiving oscillator power appears 180 degrees out of phase at crystals 214 and 224. This 180-degree phase difference is carried through the beating process and appears in the IF signals fed to the crystals 219 and 229. Transmitting oscillator 218 is fed to the B terminal of hybrid 220 and therefore reaches the two crystals 219 and 229 with 180-degree phase difference. Thus the two 180-degree phase shifts, in IF and transmitting oscillator, effectively cancel each other in the beating process so that the desired beat outputs from the two detectors are in phase. Equal phase signals at P and S of hybrid 220 will appear in arm A and not in arm B. From the hybrid the output signal goes to the radio-frequency amplifier 221 which is presumed to have a band-pass characteristic which passes the desired signal $f_3 \pm m$ and does not pass the undesired beat product generated by crystals 219 and 229 which has a frequency $$f_4 = f_T - f_2 \quad (7)$$

The complete repeater shown in Fig. 2 is generalized so that it may be adapted to different conditions such as to band-width and frequency. Thus, depending on circumstances, either or both of the radio frequency amplifiers 210 and 221 may be omitted and the amplification concentrated in the IF amplifiers, or the IF amplifiers 216 and 226 may be omitted and all amplification accomplished in one or both of the radio frequency amplifiers. Also balanced transformers may be substituted for the transformers 215, 225 and 217, 227 and the two IF amplifiers 216, 226 replaced by a single IF amplifier.

The inversion process as heretofore described has been accomplished by inverting the signal band in the frequency spectrum about the carrier frequency. It may now be pointed out, however, that additional advantages may be realized if the sideband inversion is accompanied by a translation of the frequency by a small amount from the original carrier frequency. These advantages are realized without appreciable sacrifice of the distortion canceling advantages described in detail above.

For specific example assume that the input carrier frequency $f_s$ of the inverting repeater as shown in Fig. 2 is 50,000 megacycles and the receiver oscillator frequency $f_R$ is 48,375 megacycles. Thus an intermediate frequency $f_2$ is provided of 1,625 megacycles. If the transmitter oscillator frequency $f_T$ is chosen to be 52,125 megacycles, the repeater output will be inverted about 50,500 megacycles, the new carrier frequency $f_3$, and thereby translated by 500 megacycles from the original input frequency $f_s$.

One advantage of such translation is apparent. High gain repeaters are inherently susceptible to feedback from the output to the input circuits. This is often a limiting factor in the degree of gain obtainable from a single repeater and demands excessive requirements of input and output circuit isolation. Thus frequency changing in the repeater allows the input and output signals to be at different frequencies thereby eliminating the probability of feedback.

Figure 3:
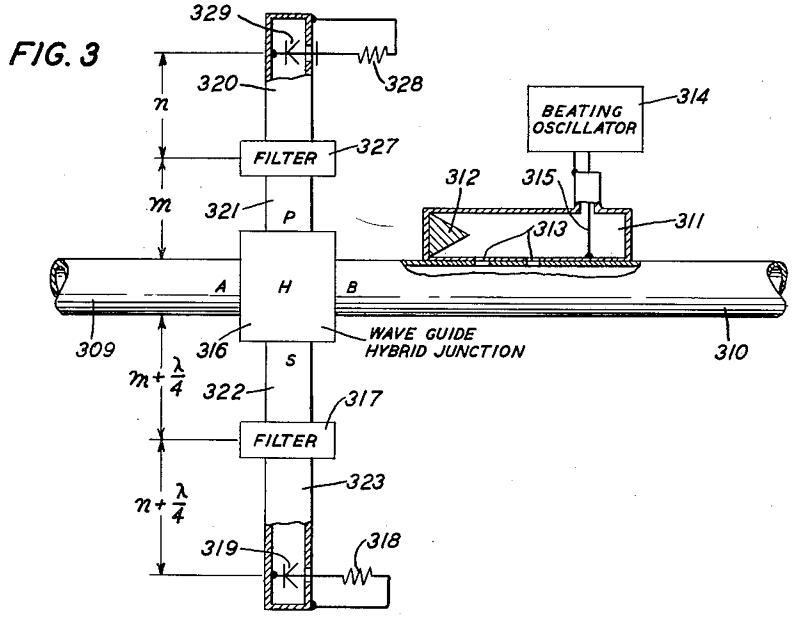
Fig. 3 illustrates a bridging inverter capable of substitution for the inverting repeater.

Fig. 3 shows a particular embodiment of a bridging inverter capable of performing sideband inversion with or without translation at a point in a wave-guide system where it is desirable to invert the signal frequencies and/or translate a particular amount without inserting gain or at a point where radio frequency amplification only is used. The bridging inverter may be connected to a transmission line or wave guide in such a way that it will select a certain desired frequency band arriving either from the left on line 309 or from the right on line 310. The selected frequency band will be inverted and translated in frequency and returned to the transmission system. Signals arriving from the left will be sent on from the device to the right via line 310 and similarly signals arriving from the right will be sent on to the left via line 309. While the device can work in either direction, it cannot work in both directions at once.

The inverter comprises a beating oscillator 314 coupled by means of directional coupler 311 to wave guide 310. Wave guide 310 is connected to termination B of hybrid junction 316, and wave guide 309 is connected to the conjugate termination A thereof. Filter sections 317 and 327 are connected to the conjugate arms P and S of hybrid 316 and the outputs of each filter are terminated by crystals 319 and 329, respectively.

The directional coupler 311 may be of the type disclosed in the United States application of W. W. Mumford, Serial No. 540,252, filed June 14, 1944, now United States Patent 2,562,281 issued July 31, 1951, and described in the Proceedings of the Institute of Radio Engineers, February 1947, volume 35, pages 160 to 165.

Other components are well known in the art or may be of the types described in connection with the inverting repeater shown in Fig. 2.

Identical filters 317 and 327 may have either a single pass band which includes both the input and output frequency bands $f_{in}$ and $f_{out}$, or two separate pass bands at these frequencies. In particular, they must reject any frequency bands which are to be passed through the device from line 309 to 310 without being affected. These filters must also have another pass band which includes the heterodyne frequency $f_0$ which may be expected to be approximately twice the frequency of $f_{in}$ or $f_{out}$ which will lie fairly close together. The other side of the main transmission line 310 is connected to the B arm of hybrid 316, and a directional coupler 311 is included in this line. The heterodyne oscillator 314 and a lossy termination 312 are connected to the other side of directional coupler 311. The directional coupler is arranged to feed the oscillator power toward the hybrid 316, and is adjusted to have weak coupling to the line 310 so that it does not react appreciably on signals flowing in 310. The filters 317 and 327 are connected to crystals 319 and 329 by the transmission lines 320 and 323. Resistors 318 and 328 complete the direct-current path of crystals 319 and 329 respectively. The lines 321 and 322 must be so proportioned that the effective electrical length $$m+\frac{\lambda}{4}$$

of 322 is approximately one-quarter wavelength or odd multiple thereof greater than the effective electrical length $m$ of line 321 for all frequencies which must pass through the device unaffected. Since these frequencies are likely to be near the desired $f_{in}$ and $f_{out}$ it will be assumed that these lines differ by one-quarter wavelength of the desired frequencies also in order to simplify the description. However, it will be realized that compensating filter sections can be incorporated to correct for differences in line lengths at different frequencies if this becomes necessary in a particular design. The line 323 should also have an electrical length $$n+\frac{\lambda}{4}$$

at frequencies $f_{in}$, $f_{out}$ one-quarter wavelength greater than the length $n$ of corresponding line 320.

The operation of the circuit of Fig. 3 may be analyzed as follows: Consider first frequencies arriving on line 309 which are to pass through the device unaffected. Such an input signal divides equally between arms P and S of hybrid 316 and flows through lines 321 and 322 to the filters 317 and 327 which reject these frequencies and therefore reflect them back along lines 321 and 322 toward the hybrid. However, the component that has traversed line 322 has traveled twice through the extra quarter wavelength included in 322 and therefore arrives back at the hybrid with a total phase shift of 180 degrees with respect to the component which followed line 321. As a result of this phase shift these components are transmitted out of the B arm of the hybrid to line 310 without being altered. Exactly the same thing happens for signals arriving from line 310 which are passed on to line 309 unaffected.

Now consider a signal of frequency $f_{in}\pm\Delta$ which is to be inverted. It also divides into arms P and S of the hybrid and flows through lines 321 and 320 on one side and lines 322 and 323 on the other side. This frequency is passed by the filters 317 and 327 and so reaches the crystals 319 and 329. The heterodyne oscillator signal also flows into the hybrid via arm B and through lines 321 and 320 and 322 to 323 to crystals 319 and 329, since it also passes through filters 317 and 327. The signal frequency reaches crystal 319 with an extra 180-degree phase shift with respect to the signal reaching crystal 329. Likewise, the oscillator signal reaches crystal 319 with an excess phase shift due to the lines of 360 degrees since it is approximately twice $f_{in}$. Then at the reference of crystal 329 we have a beat signal $f_1$ generated having a value equal to $$f_1 = f_0 - f_{in} = f_{out} \quad (8)$$

and at crystal 319 we have a beat $f_2$ generated having a value equal to $$f_2 = (f_0 + 180° - 360) - (f_{in} - 180°) = f_0 - f_{in} = f_{out} \quad (9)$$

In the above relation for $f_2$ the first 180-degree shift in $f_0$ is the relative phase shift in the hybrid between arms B and S, and the 360 degrees, which may be dropped, results from the excess lengths in lines 322 and 323 which also account for the 180-degree shift in $f_{in}$. The excess lengths cause twice the shift in $f_0$ that they cause in $f_{in}$ because $f_0$ is assumed to be approximately twice $f_{in}$. The beat frequencies $f_1$ and $f_2$ generated in the crystals 319 and 329 are equal and in phase. They travel to the hybrid via lines 320—321 and 322—323 and thus arrive at the hybrid 180 degrees out of phase due to the extra length of lines 322—323. This causes them to combine in the B arm of the hybrid and pass out of the device via line 310.

This type of circuit has the property of accomplishing the inversion of translation of $f_{in}$ to $f_{out}$ by a single heterodyne with one pair of crystals and one local oscillator as contrasted to the circuit of Fig. 2 which requires two sets of crystals and two local oscillators. The translation property is clear from the above description. The inversion of the slidebands may be demonstrated as follows:

$$f_0 - (f_{in} + A) = f_0 - f_{in} - A = (f_{out} - A) \quad (10)$$
$$f_0 - (f_{in} - A) = f_0 - f_{in} + A = (f_{out} + A) \quad (11)$$

Any energy which is not absorbed in the heterodyne operation by crystals 319 and 329 will, of course, be reflected. To prevent this, the crystals should be matched as nearly as possible to lines 320 and 323. However, it should be noted that in no event will an original signal, such as the signal introduced at line 309, be transmitted out line 310 along with the inverted components. One half of this original energy has experienced a phase delay of 180 degrees in reaching the crystal 319 by lines 322—323 and another 180 degrees returning to hybrid 316, with respect to the other half reflected by crystal 329. Thus, these two parts arrive in phase at hybrid 316 and cannot combine in the B arm thereof.

It is thus seen that there are at least three sets of relative phase shifts in various energy components that must be considered to obtain proper operation of the invention. First, the components reflected by the filters 317 and 327, respectively, experience equal total phase shifts, including the phase shift introduced by the hybrid 316, in passing from line 309 to line 310 by way of lines 322 and 321, respectively. Second, the components passed by the filters 317 and 327, respectively, which components are not completely absorbed in the heterodyne operation, experience a relative 180-degree difference in total phase lengths, including the effective lengths introduced by hybrid 316, in passing from line 309 to line 310 by way of lines 322—323 and 321—320, respectively. For the third set, the relative phase shift of the generated beat signals $f_1$ and $f_2$, the relative lengths of lines 322—323 and 321—320 for the original and beat signal frequencies are not material. What is required for this third set is that the relative phase of the oscillator power reaching crystals 329 and 319, respectively, be equal to the effective phase lengths to be introduced by hybrid 316 to the components $f_1$ and $f_2$, respectively. Each of these relationships is met by the wave-guide structure of Fig. 3.

Figure 4:
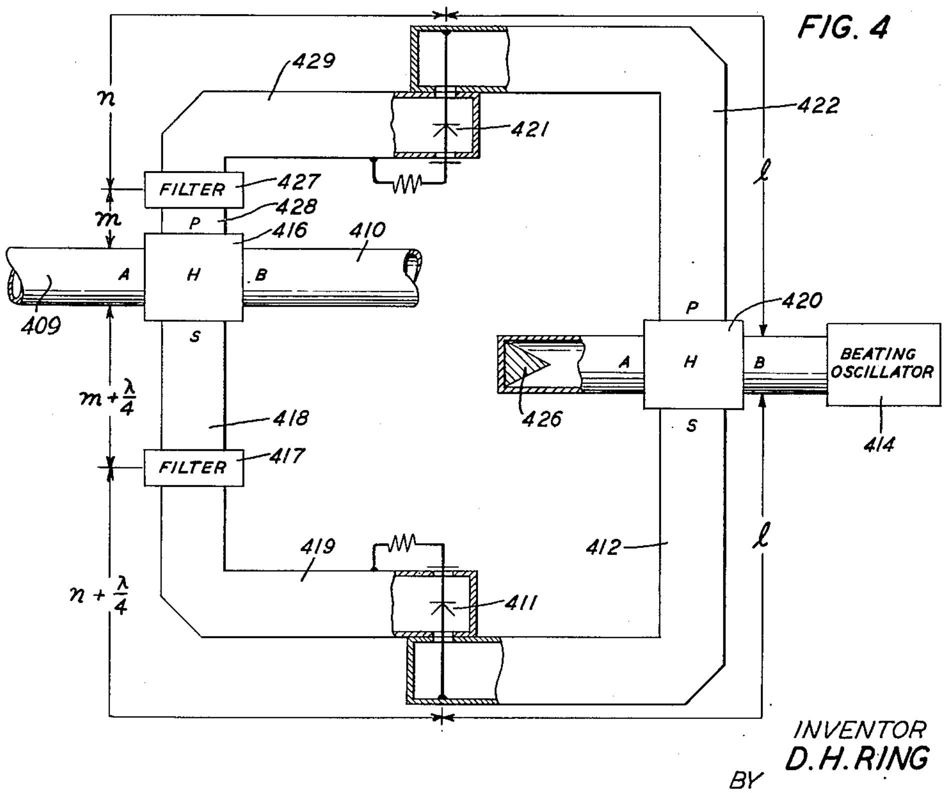
Fig. 4 illustrates a second embodiment of a bridging inverter.

It may also be seen that filters 317 and 327 serve a double function. They serve to reflect certain components back to hybrid 316 along lines 321 and 322 and they further serve to prevent unwanted modulation products from reaching these lines. Fig. 4 illustrates another arrangement having similar characteristics to those of Fig. 3 in which the above-mentioned three sets of relative phase shifts are maintained. The principal difference resides in the manner in which oscillator power is supplied. Thus, the input line 409 and the output line 410 are connected to the A and B arms of hybrid 416. The S and P arms of 416 are connected to the rejection filters 417 and 427, respectively, via lines 418 and 428. The crystal rectifiers 411 and 421 are connected to the filters 417 and 427 by lines 419 and 429. Lines 418 and 419 of lengths $$m + \frac{\lambda}{4} \text{ and } n + \frac{\lambda}{4}$$

respectively, are effectively one-quarter wavelength or an odd multiple thereof longer than lines 428 and 429 of lengths $m$ and $n$, respectively. The heterodyne oscillator 414, operating at approximately twice the desired signal frequency may be connected to the crystals 411 and 421 by any desired balanced circuit which will apply the oscillator signal to these detectors in mutual out of phase relation. A convenient way is to use the hybrid 420 with oscillator 414 connected to the B arm and the crystals 411 and 421 fed via lines 412 and 422 of equal length from the S and P arms. Arm A should be terminated in a matched attenuator 426 to absorb stray reflections. Filters 417 and 427 should reject signals of all frequencies to be passed through the device unaffected, and pass the desired frequencies $f_{in}$ and $f_{out}$. Their performance at $f_0$ need not be specified.

This circuit operates in the same manner as that shown in Fig. 3 with respect to frequencies rejected by the filters. Frequencies passed by filters 417 and 427 go on to crystals 411 and 421 where they form beat notes with the oscillator 414 frequency $f_0$. In this case $f_{in}$ reaches crystal 411 with an excess phase shift of one-half wavelength over the component reaching crystal 421, and $f_0$ reaches crystals 411 and 421 with a phase difference of 180 degrees since oscillator 414 is connected to the B arm of hybrid 420. Therefore, $$f_1 = f_0 - f_{in} = f_{out} \quad (12)$$
$$f_2 = (f_0 + 180) - (f_{in} - 180°) = f_0 - f_{in} = f_{out} \quad (13)$$

where $f_1$ and $f_2$ are the beat frequencies generated by crystals 421 and 411, respectively. Frequencies $f_1$ and $f_2$ reach the hybrid 416 by way of lines 428—429 and 418—419, respectively, and $f_2$ is retarded one-half wavelength with respect to $f_1$ by the extra half wavelength shift in line 418—419. This changes the relative phase difference to 180 degrees at the hybrid so that $f_1$ and $f_2$ appear at arm B of hybrid 416 in phase and are transmitted out of the device on line 410.

Having thus described the operation of the inverting repeaters of Figs. 3 and 4, certain refinements in the component configuration may be pointed out. In the foregoing description it has been assumed that the beating oscillator frequency, in each case represented by $f_0$, was approximately twice the line frequencies, in each case represented by $f_{in}$. The crystal detectors employed produce a modulated output which had a frequency of $f_0-f_{in}$. This type modulation is known in the art as second order modulation.

Third order modulation may, however, be employed, and under certain circumstances would be desirable since the beating oscillator frequency $f_0$ would then be required to have approximately the same frequency as $f_{in}$ rather than twice the frequency thereof. If an oscillator frequency $f_0$ and a signal frequency $f_{in}$ are applied to a third order detector the modulated output will have a frequency $2f_0-f_{in}$, or in other words, the effect of the third order modulator is to effectively convert the oscillator frequency $f_0$ to $2f_0$ and then beat this in the manner of the second order modulator with $f_{in}$. Further, all phase angles associated with $f_0$ are also multiplied by the factor 2. The importance of this feature may be seen by referring again to Fig. 3.

If third order modulators are employed for detectors 319 and 329, and beating oscillator 314 has a frequency approximately equal to $f_{in}$, lines 322 and 323 may have a length of one-sixteenth wavelength greater than lines 321 and 320, respectively, or a combined wavelength of $\lambda/8$ greater than the combined length of lines 321 and 320. The purpose of this choice of length is apparent. There will be a phase shift of 45 degrees in the signal reaching detector 319, an effective phase shift of 90 degrees in the oscillator frequency (45 degrees multiplied by 2) and another 45 degrees phase shift in the modulated product returned to hybrid 316 with the resultant phase shift of 180 degrees in the signal returned to hybrid 316 from detector 319 with respect to the signal returned to hybrid 316 from detector 329. This is the relative phase shift required so that the half signals will combine in phase in the output line.

With similar phase relation adjustments, the third order modulation principles may be incorporated in the inverter configuration of Fig. 4, with the resulting advantage that the beating oscillator 414 need only operate at one-half the frequency formerly required.

Certain detector materials are known to have cubic components in their characteristics and are thus suitable for third order modulation. The ordinary silicon crystal has certain of these characteristics, however, in a somewhat less degree, and with the predominant presence of second order components. If two of these crystals are located in the same transverse plane in the waveguide section, but connected with opposite polarity, a suitable third order modulator is obtained. The respective components from each crystal will add in effect for cubic operation but will cancel so far as the second order modulation product is concerned.

In all cases it is to be understood that the above described arrangements are merely specific preferred embodiments of a small number of the many possible specific embodiments illustrative of the application of the principles of the invention. Numerous other arrangements may be devised by those skilled in the art without departing from the spirit and scope of the invention.

What is claimed is:

1. A bridging inverter for inverting a microwave multifrequency signal comprising a waveguide hybrid junction having two pairs of conjugately related terminals, an input wave guide and an output wave guide connected each to one terminal of a first pair of said terminals, one terminal of said first pair adapted to introduce wave energy in out of phase relation in the terminals of the second pair, a detector means located in an extension of each of the terminals of said second pair, the extension from one terminal of said second pair being an odd multiple of half wavelengths of the center frequency of said multifrequency signal longer than the extension from the other terminal of said second pair, means for supplying oscillator power of frequency substantially twice said center frequency to each of said detector means in mutual out of phase relation, and band-pass filter means adapted to pass at least the frequencies of said multifrequency signal connected in each of said extensions.

2. The combination according to claim 1 wherein said means for supplying oscillator power comprises an oscillator of frequency twice said center frequency connected to said one terminal of said first pair, and wherein said band-pass filter is adapted to pass said multifrequency signal and said oscillator frequency signal.

3. The combination according to claim 1, wherein said means for supplying oscillator power comprises a second hybrid junction identical to said first-named hybrid, the terminals of the second pair of terminals of said second hybrid being connected to said detector means, and an oscillator of frequency twice said center frequency connected to the terminal of the first pair of said second hybrid corresponding to said one terminal of said first hybrid.

4. A bridging inverter for inverting a microwave multifrequency signal comprising a wave guide hybrid junction having two pairs of conjugately related terminals, an input wave guide and an output wave guide connected each to one terminal of a first pair of said terminals, a detector means located in an extension of each of the terminals of the second pair, means for supplying oscillator power of frequency above said multifrequency signal to each of said detector means, band-pass filter means adapted to pass at least the frequencies of said multifrequency signal connected in each of said extensions, the distance to one of said filter means from one terminal of said second pair being an odd multiple of quarter wavelengths of the center frequency of said multifrequency signal longer than the distance to the other of said filter means from the other terminals of said second pair.

5. A bridging inverter for inverting a microwave multifrequency signal comprising a waveguide hybrid junction having two pairs of conjugately related terminals, an input wave guide and an output wave guide connected each to one terminal of a first pair of said terminals, a detector means located in an extension of each of the terminals of the second pair, the extension from one terminal of said second pair being an odd multiple of half wavelengths of the center frequency of said multifrequency signal longer than the extension from the other terminal of said second pair, means for supplying oscillator power of frequency above said multifrequency signal to each of said detector means in mutual out of phase relation, and band-pass filter means adapted to pass frequencies of said multifrequency signal connected between each of said detector means and said hybrid.

6. A bridging inverter for inverting a microwave multifrequency signal comprising a wave-guide hybrid junction having two pairs of conjugately related terminals, an input wave guide and an output wave guide connected each to one terminal of a first pair of said terminals, one terminal of said first pair adapted to introduce wave energy in out of phase relation in the terminals of the second pair, a detector means located in an extension of each of the terminals of said second pair, the phase length including the phase through said hybrid from said input to one of said detector means to said output being an odd multiple of half wavelengths of the center frequency of said multifrequency signal greater than the corresponding path through the other of said detector means, means for supplying oscillator power of frequency substantially twice said center frequency signal to each of said detector means, the total phase length from the source of said oscillator power to one of said detector means being an odd multiple of half wavelengths of said oscillator frequency greater than the corresponding phase length to the other of said detector means, and band-pass filter means adapted to pass frequencies of said multifrequency signal connected between each of said detector means and said hybrid.

DOUGLAS H. RING.

REFERENCES CITED

The following references are of record in the file of this patent:

UNITED STATES PATENTS

| Number | Name | Date |
|---|---|---|
| 2,462,841 | Bruck | Mar. 1, 1949 |
| 2,484,256 | Vaughn | Oct. 11, 1949 |
| 2,496,521 | Dicke | Feb. 7, 1950 |